Nov. 10, 1931.  E. L. HOUGH  1,831,563
AUTOMATIC CONTROL EQUIPMENT
Filed Aug. 15, 1927
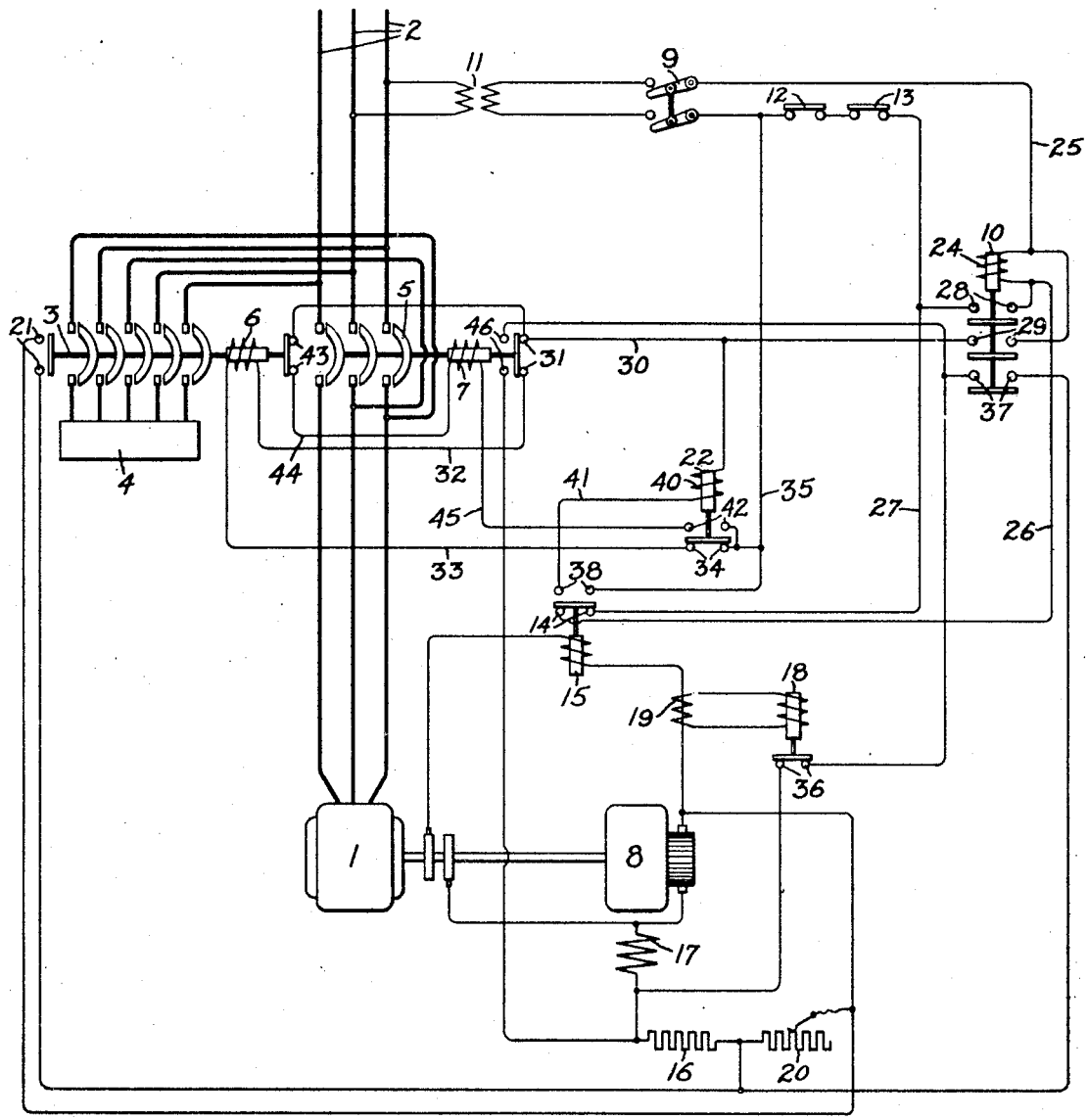
Inventor:
Eugene L. Hough,
by
His Attorney.

Patented Nov. 10, 1931

1,831,563

UNITED STATES PATENT OFFICE

EUGENE L. HOUGH, OF RICHMOND HEIGHTS, MISSOURI, ASSIGNOR TO GENERAL ELECTRIC COMPANY, A CORPORATION OF NEW YORK

AUTOMATIC CONTROL EQUIPMENT

Application filed August 15, 1927. Serial No. 212,952.

My invention relates to automatic control equipments for dynamo-electric machines, and particularly to automatic control equipments for starting synchronous motors and the like.

It is the usual practice to start synchronous motors of the "self-starting" type by impressing a relatively low alternating current on the armature of the machine with the motor field winding unexcited so that the motor operates as an induction motor while starting from rest and accelerating. When the motor speed reaches a predetermined value, preferably substantially synchronous speed, the motor field winding is excited with direct current and then normal alternating current voltage is impressed on the motor armature.

One object of my invention is to provide an improved arrangement for starting a synchronous motor in the above described manner.

In accordance with the preferred embodiment of my invention the motor field winding is energized by an exciter, which is preferably driven by the motor, and a relatively high resistance is normally connected in the excitation circuit of the exciter during the starting operation so that the exciter voltage cannot build up. Means are provided for removing the high resistance from the excitation circuit of the exciter when the motor reaches a predetermined speed and other means are provided for effecting the application of normal alternating current voltage to the motor armature after the exciter voltage has built up and the motor has been pulled into synchronism.

My invention will be better understood from the following description taken in connection with the accompanying drawing and its scope will be pointed out in the appended claims.

Referring to the accompanying drawing, which shows a control arrangement for a synchronous motor embodying my invention, 1 represents a synchronous motor, the armature of which is arranged to be supplied from a suitable source of alternating current 2, shown as a polyphase supply circuit. In order to impress a relatively low voltage on the armature when the motor is started, switching means 3 is provided which, when closed, connects a compensator 4 between the motor 1 and the supply circuit 2. In order to impress normal voltage on the motor armature after the motor has been started, switching means 5 is provided which, when closed, connects the motor armature directly to the supply circuit 2. The switching means 3 and 5 may be of any suitable type, examples of which are well known in the art. As shown in the drawing, the switching means 3 and 5 are contactors and are provided with the closing coils 6 and 7 respectively which, when energized, close the respective contactors. The motor is provided with a field winding which is arranged to be supplied with direct current from an exciter 8. As shown in the drawing the exciter is direct connected to the motor 1 and the motor field winding is permanently connected across the exciter brushes.

In order to start and stop the motor under normal conditions a hand switch 9 is provided which, when closed, effects the starting of the motor and which, when opened, effects the stopping of the motor. It is to be understood, however, that any suitable means, examples of which are well known in the art, may be used in place of the hand switch 9. As shown in the drawing, the switch 9, when closed, completes a circuit for a master relay 10 which in turn completes a circuit for the closing coil 6 of the starting contactor 3. In order to insure that the motor is started only in case the supply circuit is energized, the master relay is energized from one phase of the supply circuit by means of a transformer 11. The circuit of the master relay 10 also includes contacts 12 and 13 of suitable protective devices associated with the motor and its control apparatus. In order to simplify the drawing, these protective devices are not shown since such devices are well known and furthermore do not constitute a part of my present invention. The circuit of the master relay 10 also includes contacts 14 of a relay 15 which is connected in the field circuit of the motor. This relay 15 is designed in any suitable manner so that it responds only to a predetermined value of direct current. Therefore, the energizing circuit of the master relay 10 cannot be completed when the motor field winding is being excited with direct current from the exciter 8.

In order to prevent the exciter voltage 8 from building up during the starting operation of the motor until it reaches substantially synchronous speed a relatively high resistor 16 is normally connected in series with the shunt field winding 17 of the generator. This resistor 16 is of such a high value that substantially no current flows through the field winding 17 as long as it is connected in series therewith.

In order to short-circuit this resistor 16 so that the exciter voltage may build up after the machine reaches substantially synchronous speed, I provide a relay 18 which is arranged to be energized in response to the current induced in the motor field circuit during the starting operation. As shown, the coil of this relay 18 is connected to the secondary of a transformer 19, the primary of which is connected in series with the motor field winding. As long as the induced current in the motor field circuit is above a predetermined value the relay 18 maintains its contacts open. When the motor reaches substantially synchronous speed the induced current in the motor field decreases to such a value that the relay 18 closes its contacts and completes the short circuit around the resistor 16.

20 is the usual regulating resistor in the shunt field circuit of the exciter. In order that the exciter voltage may build up very quickly during the starting operation, I provide the starting contactor 3 with the auxiliary contacts 21 for short-circuiting this resistor 20 during the starting operation.

In order to effect the opening of the starting contactor 3 and the closing of the running contactor 5 after the exciter voltage has built up to a sufficient value to pull the motor into synchronism, I provide a transfer relay 22 which is controlled by the field relay 15. When the exciter voltage builds up so that the direct current in the motor field exceeds a predetermined value the field relay operates and completes a circuit for the transfer relay 22 which in turn effects the opening of the starting contactor 3 and the closing of the running contactor 5.

The operation of the arrangement shown in the drawing is as follows: When the motor 1 is shut down and the control switch 9 is open the various control devices are in the position shown in the drawing. When it is desired to start the motor the control switch 9 is closed and a circuit is completed for the closing coil 24 of the master relay 10 if all of the various devices are in an operative condition. The circuit of the coil 24 is from one terminal of the secondary of the transformer 11 through the control switch 9, conductor 25, coil 24, conductor 26, contacts 14 of relay 15, conductor 27, protective contacts 13 and 12, contacts of the control switch 9 to the other secondary terminal of the transformer 11. The relay 10 by closing its contacts 28 completes a locking circuit for itself which is independent of the contacts 14 of the field relay 15. Therefore, the master relay 10 is not deenergized in response to the subsequent operation of the field relay 15.

The master relay by closing its contacts 29 completes a circuit for the closing coil 6 of the starting contactor 3 so that a relatively low voltage is impressed upon the armature of the motor 1 to start the motor. The circuit of the closing coil 6 is from one secondary terminal of the transformer 11 through the control switch 9, conductor 25, contacts 29 of the master relay 10, conductor 30, auxiliary contacts 31 on the running contactor 5, conductor 32, closing coil 6, conductor 33, contacts 34 of transfer relay 22, conductor 35, contactor control switch 9 to the other secondary terminal of the transformer 11.

The closing of the contactor 3 causes the motor 1 to operate as an induction motor. As long as the motor is operated at a speed below synchronous speed an alternating current is induced in the field winding of the motor so that the relay 18 opens its contacts 36 as soon as the contactor 3 closes and maintains these contacts open until the induced current decreases below a predetermined value. Therefore, the short circuit around the high resistor 16 is open so that the exciter voltage cannot build up. When the motor reaches substantially synchronous speed the relay 18 closes its contacts 36 and completes the short circuit around the resistor 16. This short circuit also includes contacts 37 of the master relay 10. As soon as the resistor 16 is short-circuited the exciter voltage starts to build up so that direct current is supplied to the motor field winding. As soon as the direct current through the motor field exceeds a predetermined value the relay 15, which does not respond to alternating current, but does respond to direct current, opens its contacts 14 and closes its contacts 38. The opening of the contacts 14 at this time has no effect since the master relay has completed a locking circuit for itself through its contacts 28. The closing of the contacts 38 completes a circuit for the transfer relay 22 which in turn effects the opening of the circuit of the closing coil 6 of the starting contactor 3 and the closing of the circuit for the closing coil 7 of the running contactor 5. The circuit of the transfer relay 22 is from one secondary terminal of the transformer 11 to the control switch 9, conductor 25, contacts 29 of master relay 10, conductor 30, coil 40 of the transfer relay 22, conductor 41, contacts 38 of relay 15, conductor 35, control switch 9 to the other secondary terminal of the transformer 11. The relay 22 by opening its contacts 34 opens the above traced circuit for the closing coil 6 and by closing its contacts 42 completes a circuit for the closing coil 7 of the running contactor 5 from one secondary terminal of the transformer 11 through control switch 9, conductor 25, contacts 29 of master relay 10, conductor 30, auxiliary contacts 43 on starting contactor 3, conductor 44, closing coil 7 of running contactor 5, conductor 45, contacts 42 of transfer relay 22, conductor 35, control switch 9 to the other secondary terminal of transformer 11. The energization of closing coil 7 closes the running contactor 5 so that normal voltage is impressed upon the motor armature.

When the starting contactor 3 opens, the opening of its auxiliary contacts 21 removes the short circuit around the regulating rheostat 20 in the shunt field circuit of the generator 8 so that the exciter voltage is limited to a predetermined value.

When the running contactor 5 closes, its auxiliary contacts 46 complete the circuit in shunt around contacts 36 of the relay 18 so as to prevent any inductive disturbance in the field circuit which may occur due to the transfer from the starting to the running connections from opening the short circuit around the resistor 16 in the shunt field circuit of the generator.

The motor is shut down under normal conditions by opening the control switch 9 which in turn opens the circuit of the coil 24 of the master relay 10. The relay 10, by opening its contacts 29, opens the circuit of the closing coil 7 of the running contactor 5 so that the motor armature is disconnected from the supply circuit 2. The opening of the contacts 29 also opens the circuit of the coil 40 of the transfer relay 22 so that this relay is restored to its deenergized position. The opening of the contacts 37 of the master relay 10 opens the short circuit around the high resistor 16 in the shunt field circuit of the exciter 8 so that the exciter voltage decreases to zero. As soon as the direct current in the motor field circuit decreases below a predetermined value the field relay 15 opens its contacts 38 and closes its contacts 14.

The motor may also be shut down by any one of the protective devices opening its respective contacts in the circuit of the coil 24 of the master relay. The shutting down operation in response to an abnormal condition is the same as in response to the operation of the control switch 9.

While I have in accordance with the patent statutes shown and described my invention as applied to a particular system, I do not desire to be limited thereto, but seek to cover in the appended claims all those modifications that fall within the true spirit and scope of my invention.

What I claim as new and desire to secure by Letters Patent of the United States is:

1. In a control system, a source of alternating current, a synchronous motor, means for connecting said motor to said source, an exciter for said motor, means responsive to a predetermined speed of said motor for increasing the excitation of said exciter when the speed of said motor increases above a predetermined value, and means responsive to a predetermined amount of current supplied to the motor field by said exciter for controlling the connection of said motor to said source.

2. In a control system, a synchronous motor, an exciter for said motor, a source of relatively low alternating current voltage, a source of relatively high alternating current voltage, connecting means for connecting said motor to said sources, means responsive to a predetermined speed of said motor for increasing the excitation of said exciter when the speed of said motor increases above a predetermined value, and means responsive to a predetermined amount of current in the motor field circuit for effecting the transfer of said motor from said relatively low to said relatively high voltage source of alternating current.

3. In a control system, a synchronous motor, a direct connected exciter for said motor, a source of relatively low alternating current voltage, a source of relatively high alternating current voltage, means for connecting said motor to said relatively low alternating current source, means responsive to the current induced in the motor field winding for effecting an increase in the excitation of said exciter when the motor speed increases above a predetermined value, means for connecting said motor to said relatively high voltage source, and means responsive to a predetermined amount of direct current in the motor field circuit for effecting the operation of said connecting means to disconnect said motor from said relatively low voltage source and the connection to the relatively high voltage source.

4. In a control system, a synchronous motor, a direct connected shunt exciter permanently connected to the motor field winding, a resistor connected in the shunt field circuit of said exciter, a source of relatively low alternating current voltage, a source of relatively high alternating current voltage, means responsive to the current induced in the motor field circuit for short-circuiting said resistor when the speed of said motor increases above a predetermined value, means for connecting said motor to said relatively high voltage source, and means responsive to a predetermined amount of direct current in the motor field circuit for effecting the operation of said connecting means to effect the disconnection of said motor from said low voltage source and the connection thereof to said high voltage source.

5. In a control system, a synchronous motor, an exciter for said motor, a source of relatively low alternating current voltage, a source of relatively high alternating current voltage, connecting means for connecting said motor to said sources, means responsive to a predetermined speed of said motor for increasing the excitation of said exciter when the speed of said motor increases above a predetermined value, and means dependent upon the voltage of said exciter building up for effecting the transfer of said motor from said relatively low to said relatively high voltage source of alternating current.

6. In a control system, a synchronous motor, a direct connected shunt generator permanently connected to the motor field winding, a resistor connected in the shunt field circuit of said generator, a source of relatively low alternating current voltage, a source of relatively high alternating current voltage, means responsive to the current induced in the motor field circuit for short-circuiting said resistor when the speed of said motor is above a predetermined value, means for effecting the operation of said connecting means to effect the disconnection of said motor from said low voltage source and the connection thereof to said high voltage source, and means controlled by said high voltage connecting means for completing a short circuit around said resistor which is independent of said induced current means.

7. In a control system, a synchronous motor, a shunt exciter for said motor, a resistor in the shunt field circuit of said exciter, and means responsive to a predetermined speed of said motor for controlling the effectiveness of said resistor in the shunt field circuit of said exciter to increase the excitation of said exciter when the speed of said motor increases above a predetermined value.

8. In a control system, a synchronous motor, an exciter for said motor, and speed responsive means for increasing the excitation of said exciter when the speed of said motor increases above a predetermined value.

9. In a control system, a synchronous machine, an exciter for said motor, means for impressing a relatively low voltage across the armature of said machine to effect the starting thereof, speed responsive means for increasing the excitation of said exciter when the speed of said motor increases above a predetermined value, and means dependent upon the building up of the voltage of said exciter for impressing a relatively high voltage across the armature of said machine.

In witness whereof, I have hereunto set my hand this eleventh day of August, 1927.

EUGENE L. HOUGH.